(12) United States Patent
Kohata

(10) Patent No.: US 12,175,143 B2
(45) Date of Patent: Dec. 24, 2024

(54) INFORMATION PROCESSING APPARATUS, METHOD, AND STORAGE MEDIUM FOR STORING PROGRAM

(71) Applicant: CANON KABUSHIKI KAISHA, Tokyo (JP)

(72) Inventor: Toru Kohata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/507,313

(22) Filed: Nov. 13, 2023

(65) Prior Publication Data
US 2024/0176561 A1 May 30, 2024

(30) Foreign Application Priority Data
Nov. 29, 2022 (JP) .................................. 2022-190576

(51) Int. Cl.
G06F 3/12 (2006.01)
(52) U.S. Cl.
CPC .......... G06F 3/1236 (2013.01); G06F 3/1204 (2013.01); G06F 3/1284 (2013.01)
(58) Field of Classification Search
CPC .... G06F 3/1236; G06F 3/1204; G06F 3/1284; G06F 11/3672; G06F 3/1219; G06F 3/1229; G06F 3/1285; H01R 13/6485; H01R 2201/06; H04L 67/025; H04N 1/00204; H04N 1/00347; H04N 1/00413; H04N 1/00432; H04N 1/00464; H04N 1/00474; H04N 1/00482; H04N 2201/0037; H04N 2201/0039; H04N 2201/0081; H04N 2201/0082; Y10T 29/49204

USPC ......................................................... 358/1.15
See application file for complete search history.

(56) References Cited

U.S. PATENT DOCUMENTS

| | | | | |
|---|---|---|---|---|
| 6,421,675 | B1 * | 7/2002 | Ryan ........................ | G06F 16/30 |
| 6,996,096 | B2 * | 2/2006 | Niida ..................... | H04L 12/282 |
| | | | | 345/161 |
| 10,949,150 | B2 * | 3/2021 | Amarendra ........... | G06F 3/1236 |
| 11,334,301 | B2 * | 5/2022 | Chew .................... | G06F 3/1207 |
| 2003/0227641 | A1 * | 12/2003 | Edmonds .............. | G06F 3/1285 |
| | | | | 358/1.15 |
| 2007/0011679 | A1 * | 1/2007 | Abe ........................ | G06F 3/121 |
| | | | | 718/100 |
| 2008/0180531 | A1 * | 7/2008 | Sekiguchi .......... | H04N 1/00278 |
| | | | | 348/207.2 |

(Continued)

FOREIGN PATENT DOCUMENTS

JP 2006-311032 A 11/2006

*Primary Examiner* — Negussie Worku
(74) *Attorney, Agent, or Firm* — VENABLE LLP

(57) ABSTRACT

The information processing apparatus communicates with a device via a USB connection in an application on which a function of the device can be executed by using a printer driver and communicates with the device via a network connection in the application. A control unit performs control to communicate with the device in the application by changing communication with the device from communication via the USB connection into communication via the network connection, in a case where the communication with the device via the USB connection cannot be performed in the application and the communication with the device via the network connection can be performed in a predetermined function of an operating system.

14 Claims, 9 Drawing Sheets

(56) References Cited

U.S. PATENT DOCUMENTS

| | | | |
|---|---|---|---|
| 2009/0204369 A1* | 8/2009 | Asai | G06F 3/1259 |
| | | | 702/186 |
| 2010/0153586 A1* | 6/2010 | Nakamura | G06F 3/1226 |
| | | | 710/16 |
| 2012/0212781 A1* | 8/2012 | Kohata | G06F 3/1285 |
| | | | 358/1.15 |
| 2013/0201519 A1* | 8/2013 | Duyk | H04L 12/2838 |
| | | | 358/1.15 |
| 2014/0002851 A1* | 1/2014 | Smith | G06F 3/1285 |
| | | | 358/1.15 |
| 2022/0050804 A1* | 2/2022 | Shiraishi | G06F 3/0482 |

* cited by examiner

FIG. 3

| | Printer List |
|---|---|
| 31 — Printer A-Network ○ ON STANDBY | |
| 32 — Printer A-USB ○ ON STANDBY \| LAST USED | Printer A-USB |
| Printer B-USB ○ OFFLINE | [34] |
| | OPEN PRINT QUEUE... |
| | OPTION AND SUPPLY... |
| | LOCATION: USB |
| | TYPE: Printer A-OS STANDARD — 35 |
| | STATE: ON STANDBY |
| 33 — [+] [−] | |
| | DEFAULT PRINTER: [LAST USED PRINTER ▲▼] — 36 |
| | DEFAULT PAPER SIZE: [A4 ▲▼] — 37 |

38 —

| NAME | TYPE |
|---|---|
| Printer A | Network |
| Printer A | USB |
| Printer B | Network |

39 —

NAME:
LOCATION:
DRIVER:

[ ADD ] — 310

INFORMATION PROCESSING APPARATUS, METHOD, AND STORAGE MEDIUM FOR STORING PROGRAM

BACKGROUND OF THE INVENTION

Field of the Invention

The present invention relates to an information processing apparatus capable of executing device functions, a method, and a storage medium for storing a program.

Description of the Related Art

Printer-specific software (hereinafter, unique printer drivers), which is provided by printer vendors, is known as software for controlling printers. A technique in which unique printer drivers are unnecessary and an operating system (hereinafter, OS) provides a standard printing function (hereinafter, OS standard printing function) is also known. The OS standard printing function runs on an OS-provided printing system (hereinafter OS printing system). As one such printing system, a Common UNIX® Printing System (CUPS®), which operates on Apple Inc.'s macOS®, is known.

Apart from printer drivers and the OS standard printing function, applications that provide various kinds of functions, such as display printing and printer status information and a function for executing maintenance functions, are also known as software for controlling printers. Here, the printer status information is, for example, information on errors occurring in the printer main body and ink remaining amount information of the printer. In addition, the maintenance function is, for example, a function for cleaning the printhead and a test print function for confirming that the printhead is not clogged. The printer status information is displayed and the maintenance functions are executed using printer vendor-specific commands (hereinafter, vendor commands), which are defined for each printer vendor, and thus cannot be implemented by the OS standard printing function as in the case of a printing function. Such functions are called vendor-specific functions below.

Forms of connection with a printer include, for example, connection by Universal Serial Bus (USB) and connection via a network. Japanese Patent Laid-Open No. 2006-311032 discloses obtaining information from a printer via a network line but switching to a USB connection when normal connection cannot be established via the network line.

One of the features of macOS' OS standard printing function is a process for when a USB cable becomes disconnected after a queue for a USB-connected printer is created and USB communication becomes impossible. At this time, if that printer is connected to a network that can be referenced by macOS, printing can be executed by changing the communication path from USB to network, without creating a new printer queue. If USB communication becomes possible again after that, communication is carried out by changing the communication path from network to USB again.

SUMMARY OF THE INVENTION

The present invention provides an information processing apparatus for preventing a device function that is executable and a device function that is inexecutable on an application depending on the form of connection for communication between the information processing apparatus and a device from being mixed, a method, and a storage medium for storing a program.

The present invention in one aspect provides the information processing apparatus, the apparatus comprising: at least one memory and at least one processor which function as: a first communication unit configured to communicate with a device via a predetermined function of an OS in an application on which a function of the device can be executed; a second communication unit configured to communicate with the device without going through the predetermined function of the OS in the application; and a control unit configured to control the second communication unit so as to communicate with the device using a form of communication with the device by which communication by the first communication unit is possible in the application.

By virtue of the present invention, it is possible to prevent a device function that is executable and a device function that is inexecutable on an application depending on the form of connection for communication between the information processing apparatus and a device from being mixed.

Further features of the present invention will become apparent from the following description of exemplary embodiments with reference to the attached drawings.

BRIEF DESCRIPTION OF THE DRAWINGS

FIG. 3 is a diagram illustrating a screen provided by an OS printing system.

DESCRIPTION OF THE EMBODIMENTS

Figure 1:
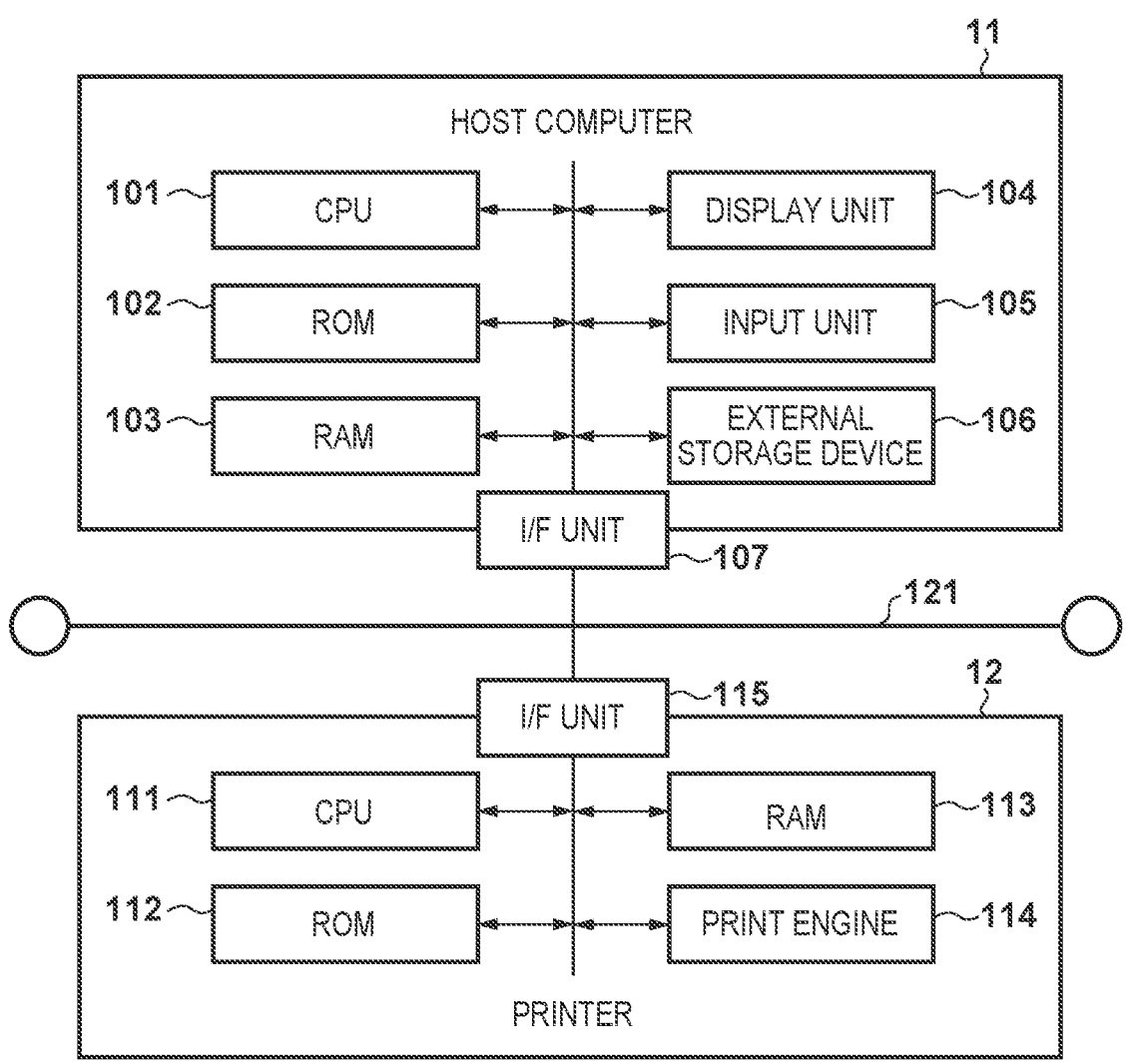
FIG. 1 is a diagram illustrating a printing system.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

Seamless switching as described above is not possible in vendor-specific communication that uses vendor commands. Therefore, when using OS standard functions on an application, a state such as that in which some device functions can be used and some device functions cannot be used on the application can occur.

According to the present disclosure, it is possible to prevent a device function that is executable and a device function that is inexecutable on an application depending on the form of connection for communication between the information processing apparatus and a device from being mixed.

First Embodiment

[System Configuration]

A hardware configuration of an image forming system according to the present embodiment will be described with reference to a block diagram of FIG. 1. FIG. 1 is a diagram illustrating an example of a printing system in which a host computer 11 and a printer 12 are capable of communicating via a network, such as Ethernet®, or a communication bus 121, such as USB. Although only one printer is illustrated in FIG. 1, any number of printers may be connected via the communication bus 121.

The host computer 11 is an example of an information processing apparatus. The host computer 11 is installed with an operating system (hereinafter, OS). The OS includes an OS standard printing function unit 202, which is OS standard printing software to be described later.

The host computer 11 is, for example, a personal computer (PC) and includes an interface (I/F) unit 107, a CPU 101, a ROM 102, a RAM 103, a display unit 104, an input unit 105, and an external storage device 106. The host computer 11 is not limited to a desktop-type PC but may also be a notebook-type PC, a tablet-type PC, or a smartphone.

The host computer 11 transmits instructions for controlling the printer 12, print data, setting commands, and the like to the printer 12. The CPU 101 is a central processing unit (CPU) for controlling each unit of the host computer 11 and executes a control program, such as the OS or a unique printer driver unit 203 to be described later. The ROM 102 is a read-only memory for storing programs and data for controlling the host computer 11. The RAM 103 is a readable/writable memory and is used as a workspace by the CPU 101. The external storage device 106 stores various kinds of control programs, such as an application and the unique printer driver unit 203.

The input unit 105 is an input device, such as a keyboard and a mouse for operating the host computer 11. The display unit 104 is a display device for, for example, displaying information inputted from the input unit 105, a user interface screen of the OS or an application, and messages. The I/F unit 107 is a communication module for transmitting and receiving data to and from the printer 12.

The printer 12, which is a printing apparatus, is, for example, an inkjet printer. The printer 12 includes an I/F unit 115, a CPU 111, a ROM 112, a RAM 113, and a print engine 114. The CPU 111 is a central processing unit for controlling each of the following units. The ROM 112 is a read-only memory for storing programs for controlling the print engine 114. The RAM 113 is a readable/writable memory and temporarily stores programs necessary for the operation of the print engine 114, setting values received from the host computer 11, and the like.

The print engine 114 performs printing on a printing medium, such as printing paper, based on print data transmitted from the host computer 11. The I/F unit 115 is a communication module for realizing communication with the host computer 11. The I/F unit 115 has, for example, a function for receiving print data from the host computer 11 and transmitting the current status information of the printer 12 to the host computer 11. The state information here is, for example, status data representing the status of the printer 12 that can be transmitted by the printer 12 in response to a request from the host computer 11 connected via the I/F unit 115. The status data includes information indicating an operation state of the printer 12, such as "currently printing" and "standby state", and an error state of the printer 12, such as "out of paper," "the cover is open," and "no amount of remaining consumable". The status data also includes information, such as the types of consumables mounted on the printer 12, a display color for each consumable, and a remaining amount value for each consumable.

[Software Configuration]

Figure 2:
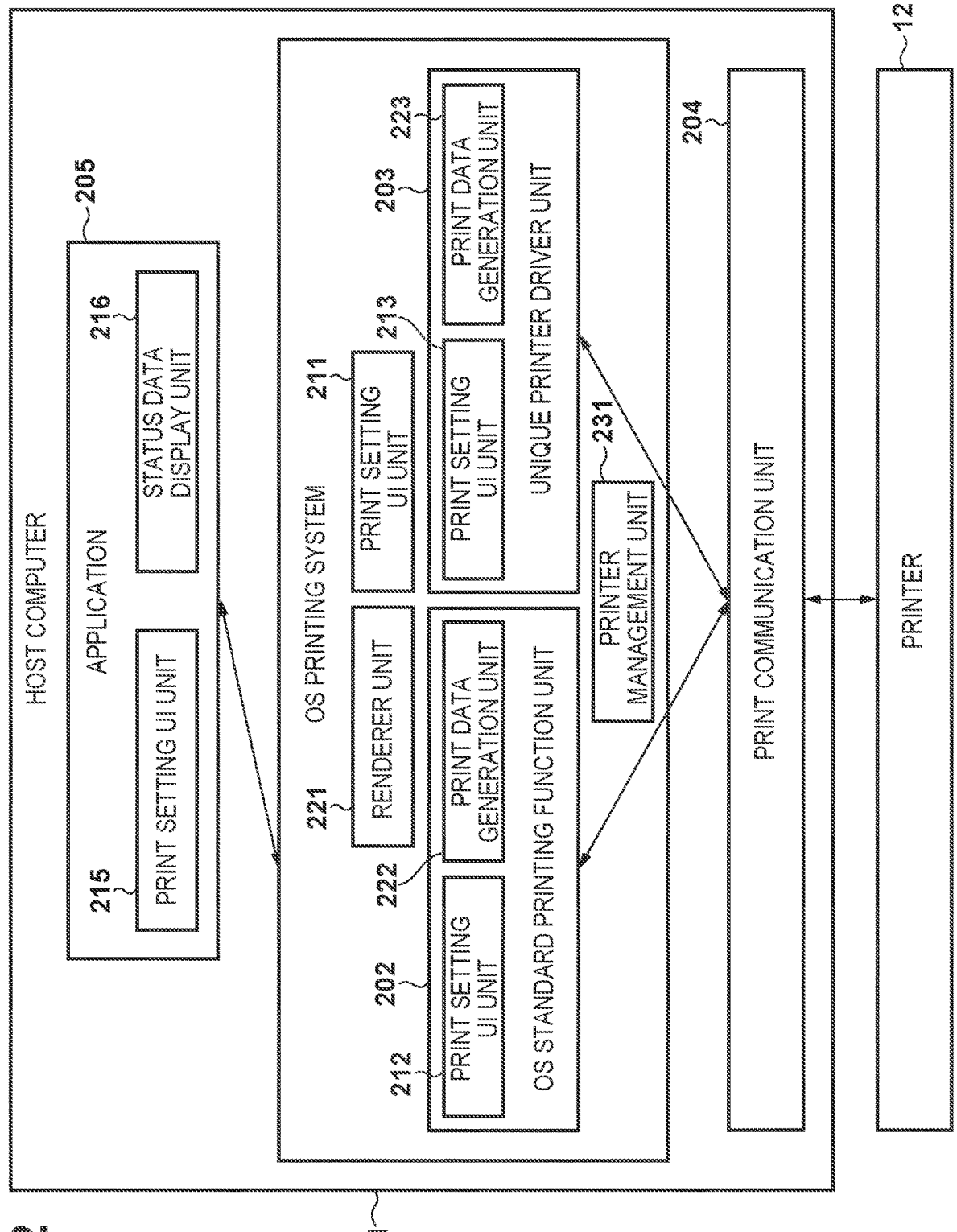
FIG. 2 is a block diagram illustrating a software configuration of a host computer.

FIG. 2 is a block diagram illustrating an example of a software configuration of the host computer 11. An OS printing system 201, which is OS standard printing software, is provided in the host computer 11. The OS standard printing function unit 202 and the unique printer driver unit 203 are provided in the OS printing system 201 in an operable manner. Further, an application 205 is provided in the host computer 11. In addition, a print setting UI unit 211, a print setting UI unit 212, and a print setting UI unit 213 are configured in the OS printing system 201, the OS standard printing function unit 202, and the unique printer driver unit 203, respectively. In addition, a print setting UI unit 215 and a status data display unit 216 are configured in the application 205. To use a printer on the OS printing system 201, the printer must first be registered in a printer management unit 231. This registration process is performed for each printer and connection form. For example, one printer is registered and managed separately for when it is connected over USB and when it is connected over a network.

The application 205 is printer software capable of generating rendered data as well as obtaining and displaying printer status data based on user instructions on the print setting UI unit 215. The application 205 is software that runs on the OS, which is basic software of the host computer 11. The application 205 has a function for printing the generated rendered data. The rendered data generated by the application 205 is, for example, Portable Document Format (PDF) data. After generating the rendered data, the application 205 issues a print request to the OS printing system 201 based on a user instruction. As for print settings for when the print request is issued, setting instructions may be received from the user in a setting screen provided by the print setting UI unit 215 of the application 205 and a setting screen provided by the print setting UI unit 211 of the OS printing system 201. In addition, the user may issue a print request using either the OS standard printing function unit 202 or the unique printer driver unit 203. In that case, the setting instructions from the user may be received in the setting screen provided by the print setting UI unit 212 or the print setting UI unit 213.

The OS standard printing function unit 202 includes a print data generation unit 222, and the unique printer driver unit 203 includes a print data generation unit 223. When the OS printing system 201 receives a print request, a renderer unit 221 generates print data from the rendered data generated by the application 205 and passes the print data to the print data generation unit 222 or the print data generation unit 223. The print data generation unit 222 or the print data generation unit 223 reflects the print settings according to the respective UI units in the print data. The print data in which the print settings have been reflected is transmitted to the printer 12 via a print communication unit 204.

The series of functions described above can be operated in units of printers managed by the printer management unit 231, and on which printer to operate the functions can be switched on the application 205. Further, in the present embodiment, a case in which the OS standard printing function unit 202 is used will be described.

[Overview of Printer Management Unit of OS Printing System]

Next, an overview of the printer management unit 231 of the OS printing system 201 will be described. FIG. 3 is a diagram illustrating an example of a screen provided by the printer management unit 231 of the OS printing system 201. The screen of FIG. 3 is displayed when the user registers a printer in the OS printing system 201. A printer list portion 32, a printer add/delete button 33, a printer preview portion 34, a printer information portion 35, a default printer setting portion 36, and a default paper size setting portion 37 are displayed in a main window 31. When registering a printer in the OS printing system 201, the user first presses a "+" button of the printer add/delete button 33. Then, a connected printer list window 38 of the printer management unit 231 is opened in a separate window, and printers currently connected to the host computer 11 are displayed in a connected printer list portion 39. At this time, if there are different connection forms, such as USB and network, one printer will be displayed as separate printers. When the user selects a desired printer therefrom and presses a printer addition execute button 310, a process for adding that printer to the printer management unit 231 is performed. Once the printer addition processing has been performed, the connected printer list window 38 of the printer management unit 231 closes and the added printer is displayed in the printer list portion 32 of the main window 31. The printers displayed in the printer list portion 32 are printers registered in the OS printing system 201 and are printers capable of performing printing and obtaining status data. When a desired printer is selected in the printer list portion 32, a preview image representing that printer is displayed on the printer preview portion 34. Further, information, such as the connection form (e.g., "USB"), used software information (e.g., "OS standard printing function unit"), and the printer status (e.g., "on standby") are displayed on the printer information portion 35.

[Behavior of OS Standard Printing Function Unit when USB is Offline]

Figure 4:
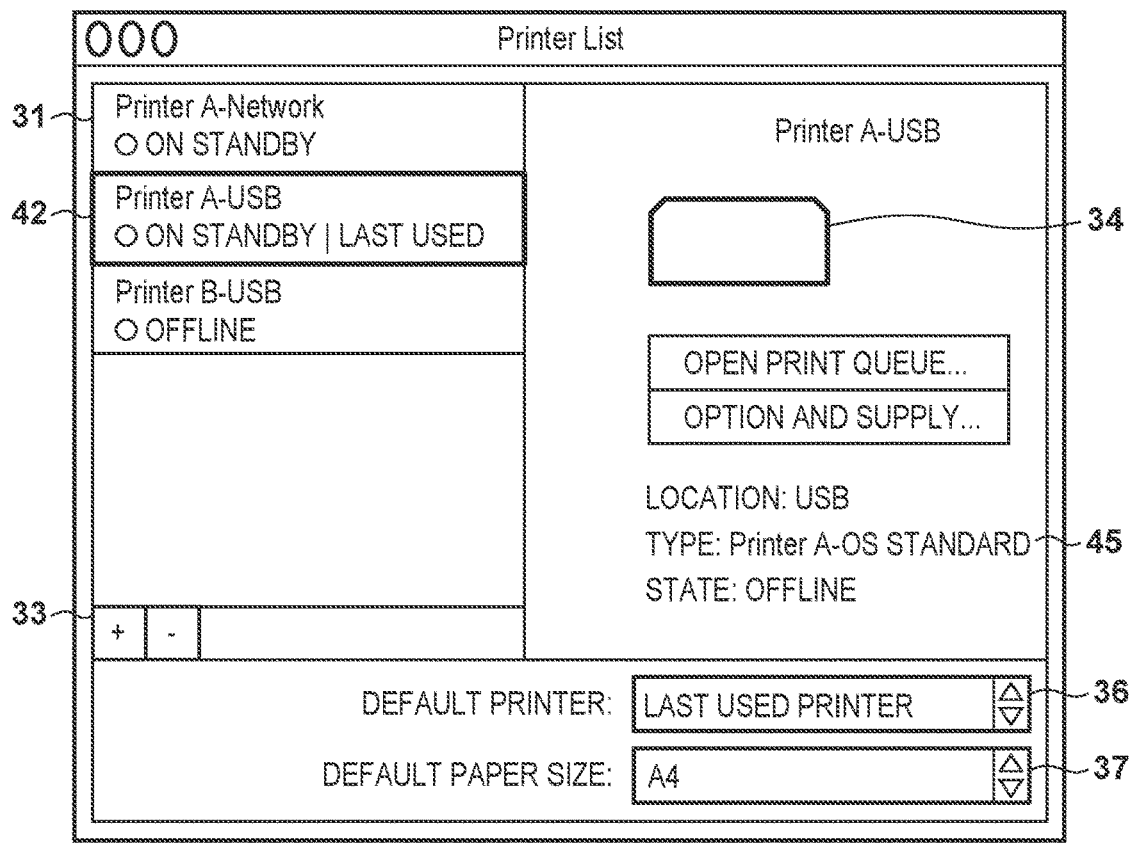
FIG. 4 is a diagram illustrating a screen provided by the OS printing system.

Next, a printing operation for when USB connection becomes unusable when using the OS standard printing function unit 202 will be described. FIG. 4 is a screen provided by the printer management unit 231 of FIG. 3 and is a diagram illustrating a state in which Printer A, which had been connected over USB has gone offline, due to the USB cable becoming disconnected. As illustrated in FIG. 4, Printer A, which is selected in the printer list portion 42, is displayed as "offline", and the printer status displayed in printer information portion 45 is also "offline".

Figure 5:
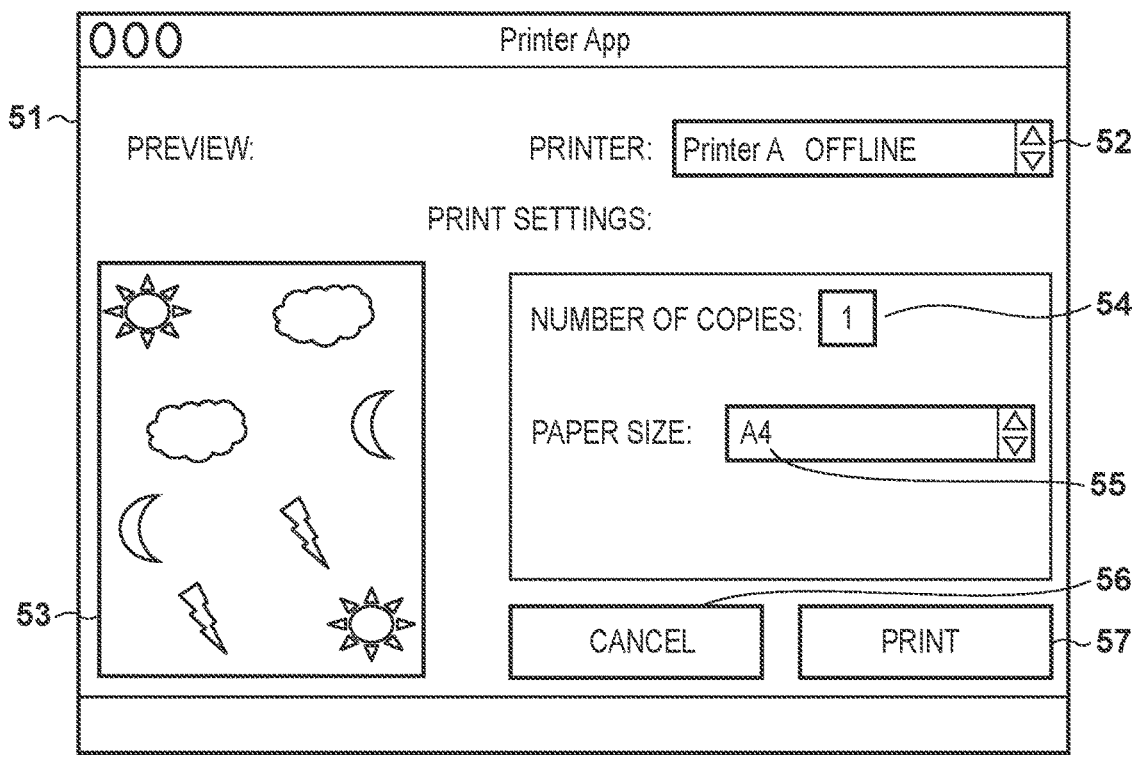
FIG. 5 is a diagram illustrating a screen to be displayed by an application.

FIG. 5 is a diagram illustrating an example of a screen to be displayed by the print setting UI unit 215 of the application 205 in the state illustrated in FIG. 4. A printer selection portion 52, a print preview portion 53, a number-of-copies setting portion 54, a paper size setting portion 55, a cancel button 56, and a print button 57 are displayed in a main window 51. When a print instruction is executed in a main screen of the application 205, the screen of FIG. 5 is displayed by the print setting UI unit 215. When the cancel button 56 is pressed, control is performed so as to return to the main screen of the application 205. When the print button 57 is pressed, a print instruction is issued to the printer 12 based on the setting details of the print setting UI unit 215. In the present embodiment, it is assumed that a print instruction is issued to the printer using the OS standard printing function unit 202. At this time, the number of copies specified in the number-of-copies setting portion 54 is outputted at the paper size set in the paper size setting portion 55 to the printer selected in the printer selection portion 52.

The setting details of the printer selection portion 52, the number-of-copies setting portion 54, and the paper size setting portion 55 are setting details managed by the OS printing system 201. Therefore, when Printer A is "offline" as illustrated in FIG. 4, "offline" or an icon indicating being offline is displayed in the printer selection portion 52 of FIG. 5. When the print button 57 is pressed in the state illustrated in FIG. 5, printing by the OS standard printing function unit 202 is performed.

In the present embodiment, when the selected printer is connected over USB and is in an offline state, the OS standard printing function unit 202 determines whether the selected printer is present on a network. When it is determined that the printer is present on a network, the connection form is automatically switched from USB to network and printing is executed. Specifically, the print communication unit 204 transmits print data to the printer 12 via a communication module for network connection. At this time, "offline" display of the printer information portion 45 of FIG. 4 turns to an "on standby" display, and thus, "offline" display of the printer selection portion 52 disappears, and an indication that normal communication is possible is displayed. On the other hand, if it is determined that the selected printer is not present on a network, printing will not be performed. At this time, "offline" display of the printer information portion 45 of FIG. 4 is maintained. Printing is temporarily executed over the network, and when USB connection is back online thereafter, printing is executed via communication over USB connection again.

[Communication Process of Vendor-Specific Function]

Figure 6:
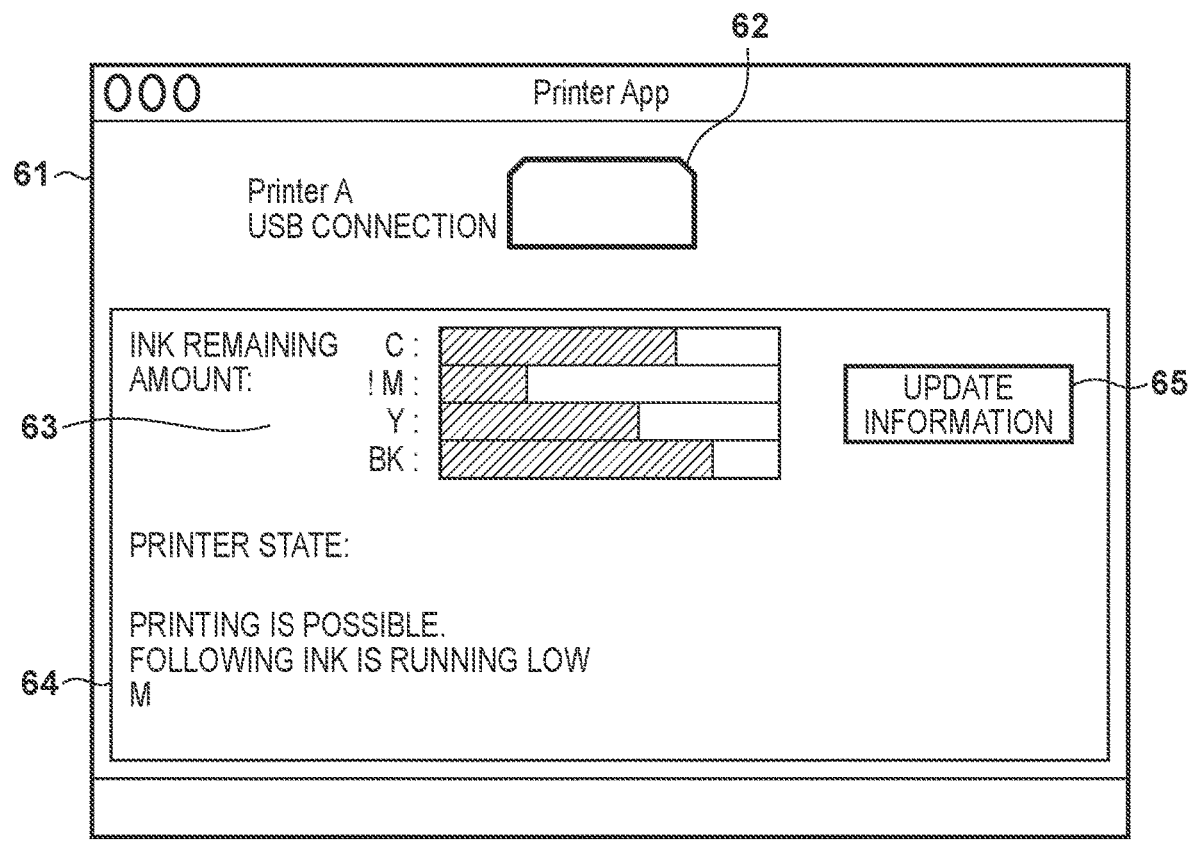
FIG. 6 is a diagram illustrating a screen to be displayed by the application.

Next, a communication process of vendor-specific functions of the application 205 will be described. As described above, the application 205 is printer software capable of obtaining and displaying status data of a printer based on a user instructions. FIG. 6 is a diagram illustrating an example of a screen to be displayed by the status data display unit 216 of the application 205. FIG. 6 illustrates a state in which "Printer A", which is connected over USB, is selected from the printers managed by the printer management unit 231 and displaying of the status has been instructed on the application 205. A printer preview portion 62, a printer ink remaining amount display portion 63, a printer status display portion 64, and an information update button 65 are displayed in a main window 61.

When display of the screen of FIG. 6 is instructed, the application 205 determines whether communication with the printer 12 by a vendor-specific method is possible. That is, in the case of FIG. 6, it is determined whether communication with the printer 12 by a vendor-specific method is possible via USB connection. When it is determined that communication with the printer 12 by a vendor-specific method is possible, the application 205 performs a process for communicating with the printer 12 using the vendor-specific method and obtains status information from the printer 12. The status information to be obtained is, for example, information on the remaining amount of ink and information on errors occurring in the printer 12. The obtained information on the remaining amount of ink is displayed for each ink color in the printer ink remaining amount display portion 63. The obtained error information is displayed in the printer status display portion 64.

On the other hand, when it is determined that communication with the printer 12 by a vendor-specific method is not possible, the application 205 switches the connection form from USB to network and determines whether communication by the OS standard printing function unit 202 is possible. This determination process is executed by passing DeviceURI information of the printer 12 for when it is connected over USB, which has been obtained in advance, to a function of a Domain Name System (DNS) service system of the OS to perform a conversion process. Specifically, an IP address being used and port information are obtained by passing DeviceURI information that starts with, for example, ippusb:// to the DNS service system function of the OS. When an IP address and predetermined port information are obtained by conversion of a domain included in DeviceURI, the connection form of the OS standard printing function unit 202 is switched from USB to network. Then, the printer status information obtained from the printer 12 via a network is reflected in the printer ink remaining amount display portion 63 and the printer status display portion 64.

The above operation is executed when display of the screen of FIG. 6 is instructed but is also executed when the information update button 65 is pressed.

[Flow of Communication Process of Vendor-Specific Function]

Figure 7:
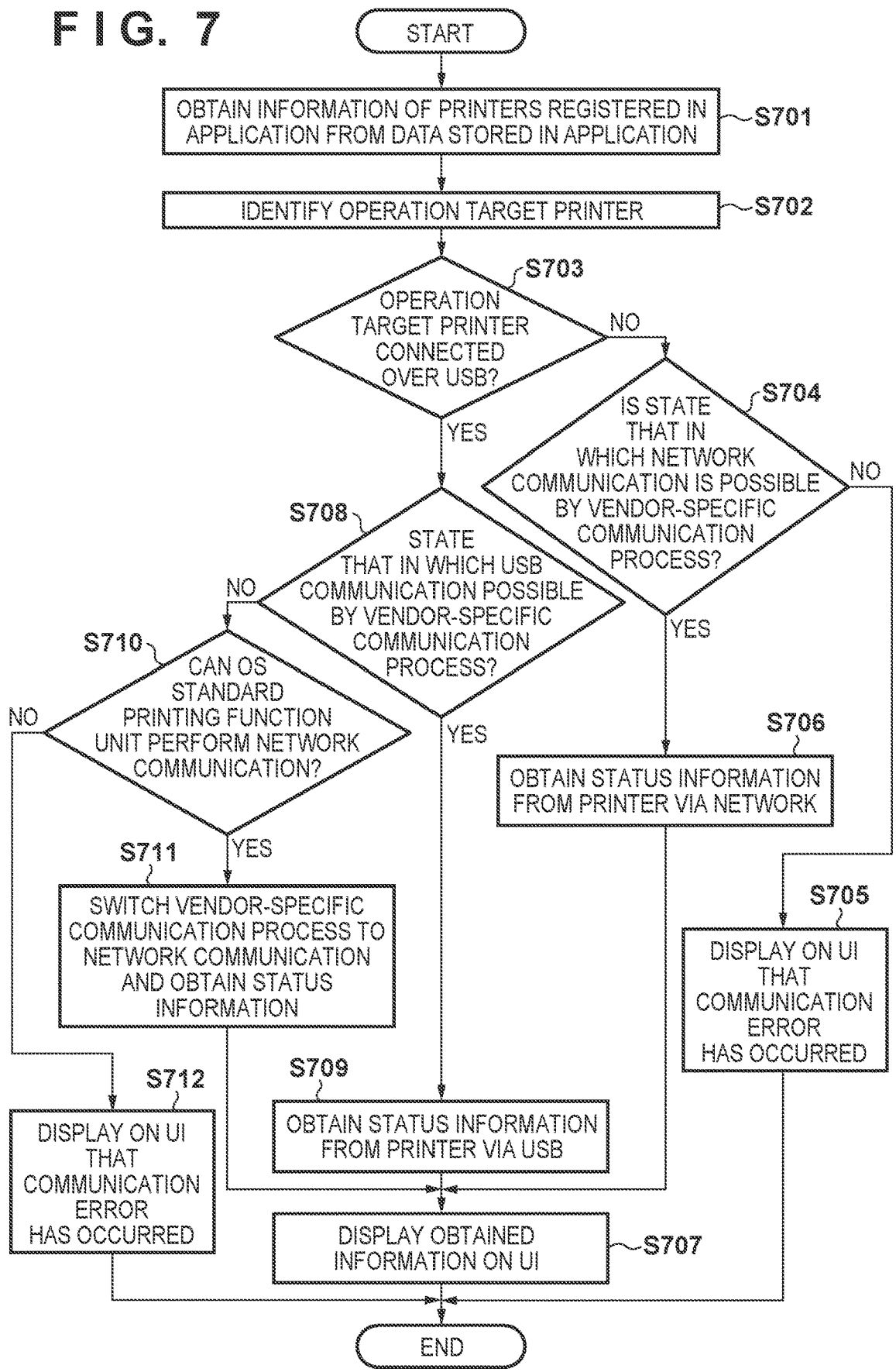
FIG. 7 is a flowchart for explaining a process to be performed by the application.

Next, a process to be executed by the status data display unit 216, which is a vendor-specific function of the application 205, will be described. FIG. 7 is a flowchart for explaining a process of the status data display unit 216. The process illustrated in FIG. 7 is realized, for example, by the CPU 101 reading out a program stored in the ROM 102 or the like into the RAM 103 and executing the program.

In step S701, upon receiving a display instruction of the screen of FIG. 6 from the user, the status data display unit 216 obtains information of printers registered in the application 205. The status data display unit 216 may perform the process of step S701 at a timing at which the application 205 is started by the user. The printers registered in the application 205 are, in other words, printers managed by the printer management unit 231. At the startup of the application 205, the application 205 obtains information of printers registered in the printer management unit 231 and stores the information in the application 205, together with data to be used in the application 205. The status data display unit 216 obtains the printer information at the start of communication associated with obtainment of the status information from the printer 12.

In step S702, the status data display unit 216 identifies a printer selected by the user from the obtained printer information. The application 205 has a function for allowing the user to select a printer to be used from a list of printer information, and here, a printer selected by the user is identified. The process of step S702 may be performed, for example, based on a selection result of the printer selection portion 52 of FIG. 5. In step S703, the status data display unit 216 determines whether the printer identified in step S702 is connected over USB. If it is determined that the printer is not connected over USB, that is, if it is connected over a network, the process proceeds to step S704.

In step S704, the status data display unit 216 determines whether the printer identified in step S702 is in a state in which network communication is possible by a vendor-specific communication process. The process of step S704 may be performed based on whether a result of an attempt at the vendor-specific communication process has succeeded or failed. Here, if it is determined that the state is that in which network communication is possible by the vendor-specific communication process, in step S706, the status data display unit 216 obtains the status information of the printer 12 via the network. Then, in step S707, the status data display unit 216 displays the obtained status information in the printer ink remaining amount display portion 63 and the printer status display portion 64 of FIG. 6 and terminates the process of FIG. 7. On the other hand, if it is determined in step S704 that the state is not that in which network communication is possible by the vendor-specific communication process, in step S705, the status data display unit 216 displays that a communication error has occurred as a UI screen (not illustrated) and terminates the process of FIG. 7.

Next, a case where it is determined in step S703 that the printer identified in step S702 is connected over USB will be described. In that case, in step S708, the status data display unit 216 determines whether the printer identified in step S702 is in a state in which USB communication is possible by a vendor-specific communication process. The process of step S708 may be performed based on whether a result of an attempt at the vendor-specific communication process has succeeded or failed. Here, if it is determined that the state is that in which USB communication is possible by the vendor-specific communication process, in step S709, the status data display unit 216 obtains the status information of the printer 12 via USB. Then, in step S707, the status data display unit 216 displays the obtained status information in the printer ink remaining amount display portion 63 and the printer status display portion 64 of FIG. 6 and terminates the process of FIG. 7.

On the other hand, if it is determined that the printer identified in step S702 is not in a state in which USB communication is possible by the vendor-specific communication process, the process proceeds to step S710. In step S710, the status data display unit 216 confirms a network communication state of the OS standard printing function unit 202 and determines whether network communication by the OS standard printing function unit 202 is possible. For example, if the USB cable is disconnected, it is determined that the state is not that in which USB communication is possible by the vendor-specific communication process for the printer identified in step S702. As described above, in step S710, the process for converting the DeviceURI information of the printer for when it is connected over USB by passing it through the function of the DNS service system of the OS is performed and determination is performed based on a result of that process. The process of step S710 will be described later in FIG. 8. If it is determined in step S710 that network communication by the OS standard printing function unit 202 is possible, the printer identified in step S702 is present on the network and communication can be performed. In that case, in step S711, the status data display unit 216 switches the vendor-specific communication process from USB communication to network communication and obtains the status information from the printer 12 via the network.

In step S711, the status data display unit 216 performs the conversion process by passing the DeviceURI information of the printer 12 for when it is connected over USB, which has been obtained in advance, through the function of the DNS service system of the OS. Here, the function of the DNS service system is, for example, a DnsServiceResolve function. The status data display unit 216 obtains an IP address of a communication destination based on a result of the conversion process. That is, the process performed at this time is an IP address obtainment process by the OS. The obtained IP address can be either IPv4 or IPv6, and an obtainment result changes depending on an IP address enable/disable setting of the OS. The status data display unit 216 can switch the vendor-specific communication process by executing a status information obtainment process targeting the obtained IP address. Then, in step S707, the status data display unit 216 displays the obtained status information in the printer ink remaining amount display portion 63 and the printer status display portion 64 of FIG. 6 and terminates the process of FIG. 7.

Meanwhile, if it is determined in step S710 that network communication by the OS standard printing function unit 202 is not possible, the printer identified in step S702 is not present on the network. Therefore, in step S712, the status data display unit 216 displays that a communication error has occurred in a UI screen (not illustrated) and terminates the process of FIG. 7.

As described above, if the form of connection with the printer selected by the user is USB connection and the vendor-specific communication process cannot be performed, the form of connection with the printer 12 is switched to network connection based on the network communication state of the OS standard printing function unit 202. Thus, by using the post-switch connection form, it is possible to execute the vendor-specific communication process for the printer 12.

The process may be a process other than the flowchart illustrated in FIG. 7. For example, if it is determined in step S703 that the printer identified in step S702 is connected over USB, the following process may be performed.

If it is determined that the printer identified in step S702 is connected over USB, the status data display unit 216 confirms the network communication state of the OS standard printing function unit 202 as described above in step S710. Then, the process is switched according to the following communication states (1) to (3) of the OS standard printing function unit 202 obtained from a result of that confirmation. The following (1), (2), and (3) correspond, respectively, to steps S808, S807, and S804 of FIG. 8 to be described later.

(1) USB communication is possible.
(2) USB communication is not possible, and network communication is possible.
(3) USB communication is not possible, and network communication is not possible.

In the case of (1), the status data display unit 216 obtains the status information of the printer 12 via USB. Then, the status data display unit 216 displays the obtained status information in the printer ink remaining amount display portion 63 and the printer status display portion 64 of FIG. 6 and terminates the process.

In the case of (2), the status data display unit 216 switches the vendor-specific communication process from USB communication to network communication and obtains the status information from the printer 12 via the network. Then, the status data display unit 216 displays the obtained status information in the printer ink remaining amount display portion 63 and the printer status display portion 64 of FIG. 6 and terminates the process.

In the case of (3), the status data display unit 216 displays that a communication error has occurred in a UI screen (not illustrated) and terminates the process.

Further, it may be displayed to the user as a UI screen of the status data display unit 216 that the connection form has been switched at a timing at which the connection form is switched in step S711. In addition, an item "match the vendor-specific communication process to the connection form of the OS standard printing function unit" may be provided as a setting item of the status data display unit 216 of the application 205. For example, when that item is selected by the user, a process for performing a switch according to (1) to (3) described above is executed.

Figure 8:
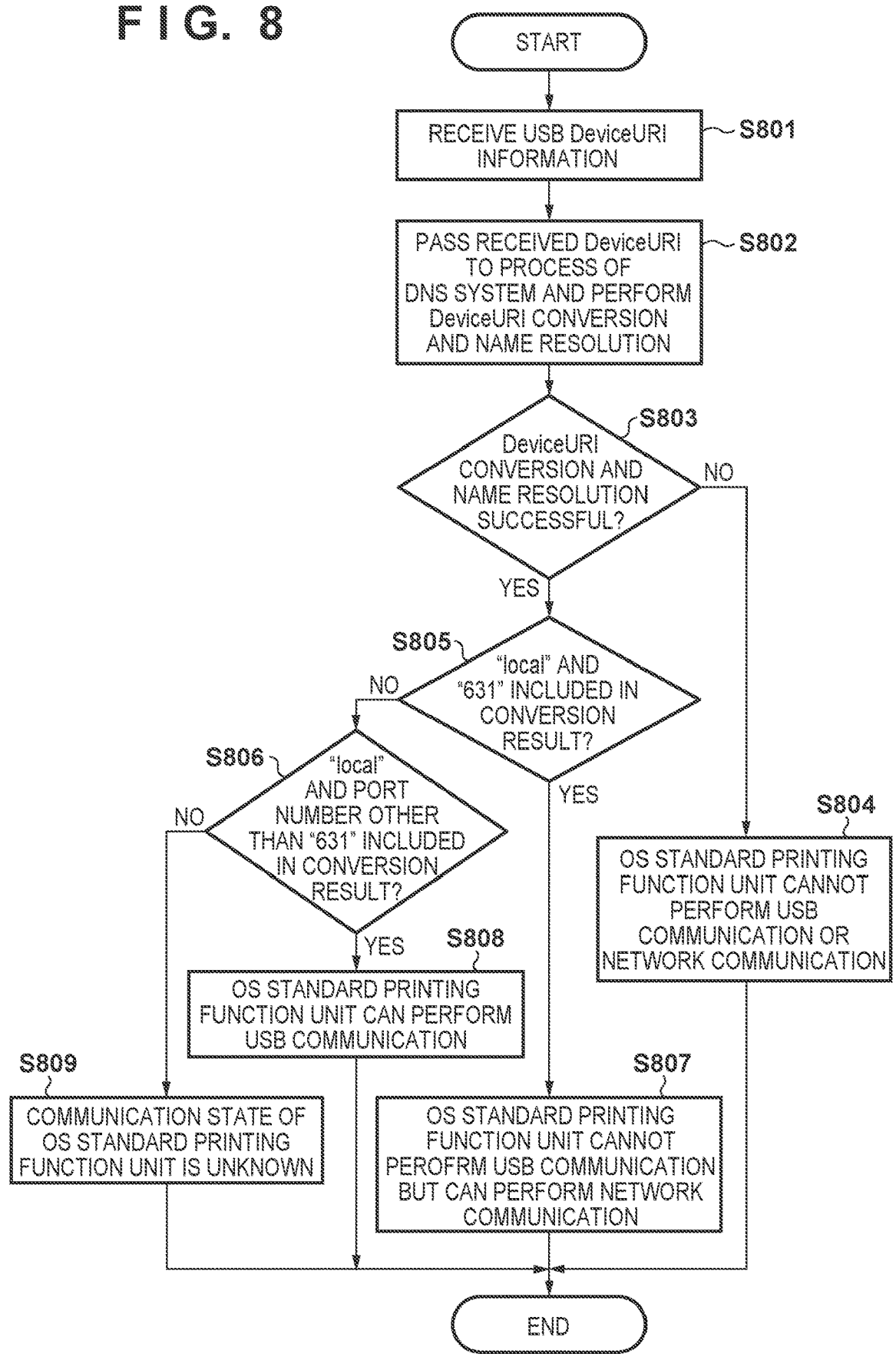
FIG. 8 is a flowchart for explaining a process to be performed by the application.

FIG. 8 is a flowchart illustrating the process of step S710. In step S801, the status data display unit 216 obtains USB DeviceURI information, which has been obtained in advance when USB communication is possible. The DeviceURI information is, for example, URI information that starts with ippusb://.

In step S802, the status data display unit 216 performs conversion and name resolution of the DeviceURI by passing the DeviceURI information obtained in step S801 through the function of the DNS service system. A result of this conversion allows the status data display unit 216 to determine the communication state of the OS standard printing function unit 202.

In step S803, the status data display unit 216 determines whether the conversion and name resolution process of step S802 has succeeded. If it is determined in step S803 that the conversion and name resolution process has failed, the process proceeds to step S804. In step S804, the status data display unit 216 determines that the OS standard printing function unit 202 cannot perform both USB communication and network communication, stores that determination result in a storage region, and terminates the process of FIG. 8. On the other hand, if it is determined in step S803 that the conversion and name solution process has succeeded, in subsequent processes, the status data display unit 216 determines the communication state of the OS standard printing function unit 202 from the conversion result. In the present embodiment, determination is performed based on the features of the conversion result, which depends on the connection form of the OS standard printing function unit 202.

In step S805, the status data display unit 216 determines whether a condition that "a character string of the conversion result includes both 'local' and '631', which is a port number" is satisfied. If it is determined that the condition is satisfied, in step S807, the status data display unit 216 determines that the OS standard printing function unit 202 cannot perform USB communication and can perform network communication, stores that determination result in the storage region, and terminates the process of FIG. 8. If determination is made as in step S807, the converted DeviceURI is an address representing network connection. In this case, the communication process of a vendor-specific function will succeed if network connection is performed; therefore, in step S711 of FIG. 7, the connection form is switched from USB connection to network connection.

On the other hand, if it is determined in step S805 that the condition is not satisfied, the process proceeds to step S806. In step S806, the status data display unit 216 determines whether a condition that "a character string of the conversion result includes 'local' but a numerical value other than '631' is included as the port number" is satisfied. If it is determined that the condition is satisfied, in step S808, the status data display unit 216 determines that the OS standard printing function unit 202 can perform USB communication, stores that determination result in the storage region, and terminates the process of FIG. 8. In the process for switching the process according to the communication states (1) to (3) of the OS standard printing function unit 202 described above, determination may be made as in step S808. In this case, the status data display unit 216 obtains the status information of the printer 12 via USB.

On the other hand, if it is determined in step S806 that the condition is not satisfied, the conversion result is unknown despite the conversion being successful. Therefore, in step S809, the status data display unit 216 determines that the communication state of the OS standard printing function unit 202 is unknown, stores that determination result in the storage region, and terminates the process of FIG. 8. If determination is made as in step S809, it is determined that communication is impossible even through network connection, and in step S712 of FIG. 7, the user is notified that a communication error has occurred.

In FIG. 8, in steps S805 and S806, "631" (Internet Printing Protocol) is used as a determination criterion, as a port number aside from "local"; however, another port number may be used as a determination criterion.

As described above, according to the present embodiment, the form of connection with the printer 12 in the vendor-specific communication process of the application 205 can be changed following the communication state of the OS standard printing function unit 202. In other words, it is possible to prevent, for example, a state in which a standard printing function of the OS is executable and a state in which a function provided independently by the vendor is inexecutable from being mixed on an application that provides both the standard printing function of the OS and the function provided independently by the vendor.

Second Embodiment

A second embodiment will be described below with regard to points of difference from the first embodiment. In the first embodiment, it has been described that the connection form is temporarily switched at a timing at which the vendor-specific communication process is performed. In the present embodiment, after the connection form is switched in step S711, the connection form remains permanently switched. Such a configuration can prevent the user from having to repeatedly perform the process for switching the connection form.

Figure 9:
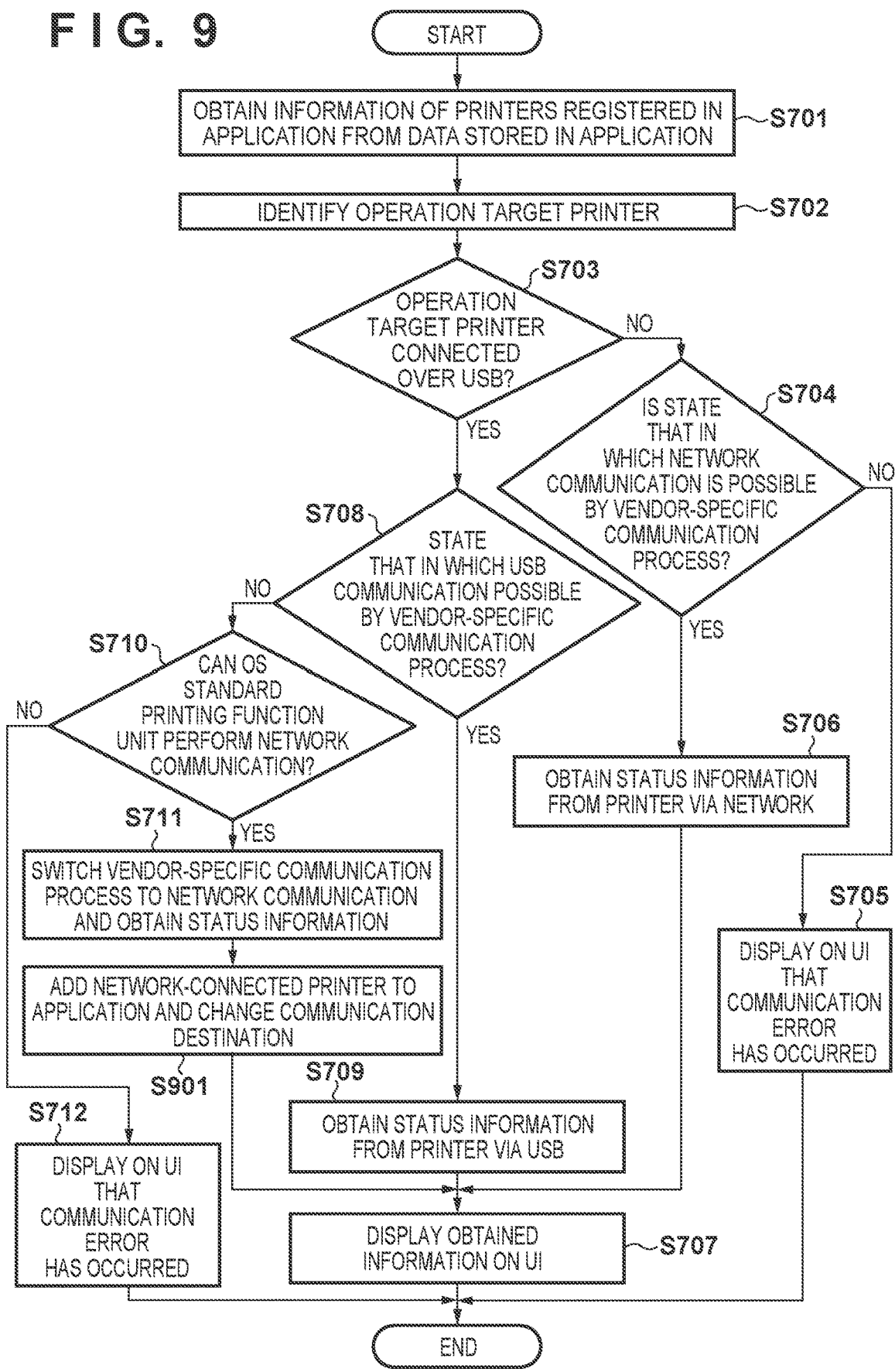
FIG. 9 is a flowchart for explaining a process to be performed by the application.

FIG. 9 is a flowchart for explaining a process of the status data display unit 216 according to the present embodiment. The process illustrated in FIG. 9 is realized, for example, by the CPU 101 reading out a program stored in the ROM 102 or the like into the RAM 103 and executing the program. Since the description for steps S701 to S712 of FIG. 9 are the same as that for steps S701 to S712 of FIG. 7, the description thereof will be omitted.

In the present embodiment, after a switch is made in step S711 from USB communication to network communication for the vendor-specific communication process, the process proceeds to step S901. In step S901, the status data display unit 216 adds a new printer, which is connected over the network, to the application 205 and changes the connection destination to the network-connected printer. After step S901, the process proceeds to step S707.

Figure 10:
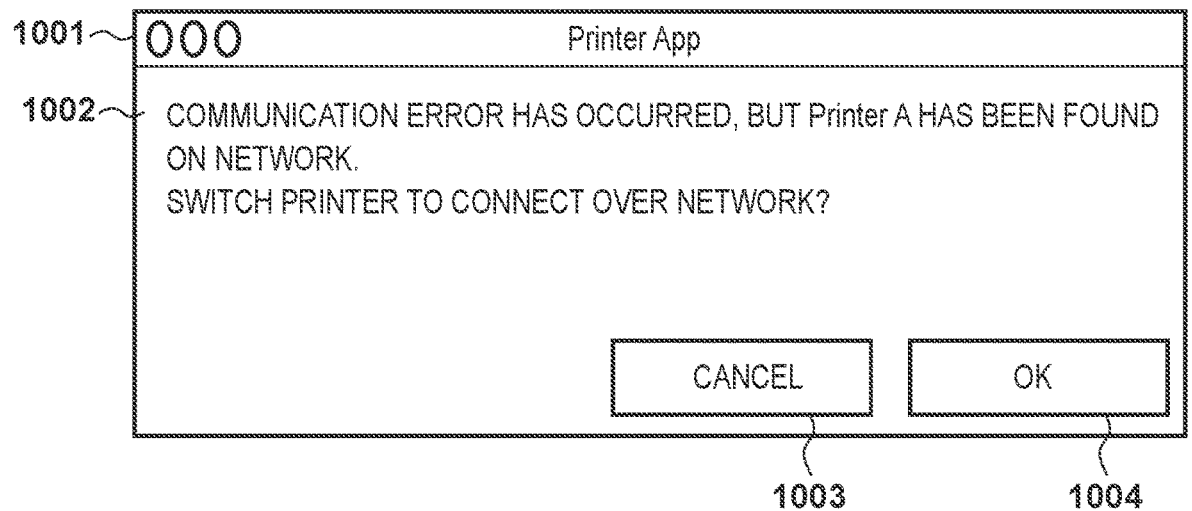
FIG. 10 is a diagram illustrating a screen to be displayed by the application.

FIG. 10 is a diagram illustrating an example of a confirmation message to be presented to the user when the connection destination is changed to a network-connected printer in step S901. A message window 1001 displays a message portion 1002, a cancel button 1003, and an OK button 1004. The status data display unit 216 displays this message at a timing at which registered printer information of the application 205 is rewritten in step S901. When the OK button 1004 is pressed by the user, the status data display unit 216 rewrites USB-connected printer information, which is already held by the application 205, to network-connected printer information by updating the USB-connected printer information. The information to be rewritten at this time is, for example, the DeviceURI information of the printer. In addition, the status data display unit 216 may request the printer management unit 231 not only to rewrite the information held by the application 205 but also to rewrite the printer information managed by the printer management unit 231 of the OS. At this time, the printer management unit 231 of the OS performs a process for adding new network-connected printer information to management targets while retaining the USB-connected printer information. For example, when the OK button 1004 is pressed by the user, the status data display unit 216 calls the DeviceURI at the time of network connection as an argument, and the printer management unit 231 of the OS performs the process for adding the network-connected printer information. Then, the status data display unit 216 performs a process of deleting the registered USB-connected printer information originally present in the application 205. The printer management unit 231 of the OS executes the process of deleting the managed registered USB-connected printer information. In the flow described above, information of an OS-registered printer itself can be rewritten.

As described above, according to the present embodiment, it is not necessary to execute the process for switching the connection form each time. Therefore, the communication performance of the application can be improved. The above-described process of deleting the registered USB-connected printer information present in the application 205 and the managed USB-connected printer information managed by the printer management unit 231 of the OS need not be performed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-190576, filed Nov. 29, 2022, which is hereby incorporated by reference herein in its entirety.

What is claimed is:

1. An information processing apparatus, the apparatus comprising:
    at least one memory and at least one processor which function as:
    a first communication unit configured to communicate with a device via a USB connection in an application on which a function of the device can be executed by using a printer driver;
    a second communication unit configured to communicate with the device via a network connection in the application; and
    a control unit configured to perform control to communicate with the device in the application by changing communication with the device from communication via the USB connection into communication via the network connection, in a case where the communication with the device via the USB connection cannot be performed in the application and the communication with the device via the network connection can be performed in a predetermined function of an operating system, OS.

2. The information processing apparatus according to claim 1, further comprising:
    a storage unit configured to store information of the device in the application, wherein
    the information of the device includes information of a form of communication.

3. The information processing apparatus according to claim 2, wherein
    the information of the device is updated accompanying control by the control unit.

4. The information processing apparatus according to claim 1, wherein
    the application obtains status information of the device.

5. The information processing apparatus according to claim 1, wherein
    the device is a printer.

6. The information processing apparatus according to claim 1, wherein
    the predetermined function of the OS is a standard printing function.

7. The information processing apparatus according to claim 1, wherein the application can issue a print instruction to the device using the printer driver,
    the application can issue a print instruction to the device using a standard printing function, and
    the predetermined function of the OS is the standard printing function.

8. The information processing apparatus according to claim 1, wherein the control unit changes, under a condition that communication with the device via the network connection can be performed in the predetermined function of the OS, the communication with the device from the communication via the USB connection into the communication via the network connection in order to perform control to communicate with the device in the application.

9. The information processing apparatus according to claim 1, wherein
    in a case where the communication with the device via the USB connection can be performed in the application, the control unit performs communication with the device via the USB connection,
    in a case where the communication with the device via the USB connection cannot be performed in the application and the communication with the device via the network connection cannot be performed in the predetermined function of the OS, the control unit performs processing of notifying an error.

10. The information processing apparatus according to claim 1, wherein the control unit changes, based on information acquired from the device by the communication via the USB connection, the communication with the device from the communication via the USB connection into the communication via the network connection in order to perform control to communicate with the device in the application.

11. The information processing apparatus according to claim 10, wherein the information acquired from the device is Device URI.

12. The information processing apparatus according to claim 1, wherein the application displays a screen indicating an ink remaining amount of the device based on information acquired from the device by the communication via the USB connection or the communication via the network connection.

13. A method executed in an information processing apparatus, the method comprising:
    communicating with a device via a USB connection in an application on which a function of the device can be executed by using a printer driver;
    communicating with the device via a network connection in the application; and
    controlling communication with the device in the application by changing communication with the device from communication via the USB connection into communication via the network connection, in a case where the communication with the device via the USB connection cannot be performed in the application and the communication with the device via the network connection can be performed in a predetermined function of an operating system, OS.

14. A non-transitory computer-readable storage medium storing a program configured to cause a computer to function to:
    communicating with a device via a USB connection in an application on which a function of the device can be executed by using a printer driver;
    communicating with the device via a network connection in the application; and
    controlling communication with the device in the application by changing communication with the device from communication via the USB connection into communication via the network connection, in a case where the communication with the device via the USB connection cannot be performed in the application and the communication with the device via the network connection can be performed in a predetermined function of an operating system, OS.

* * * * *